Figure 1:
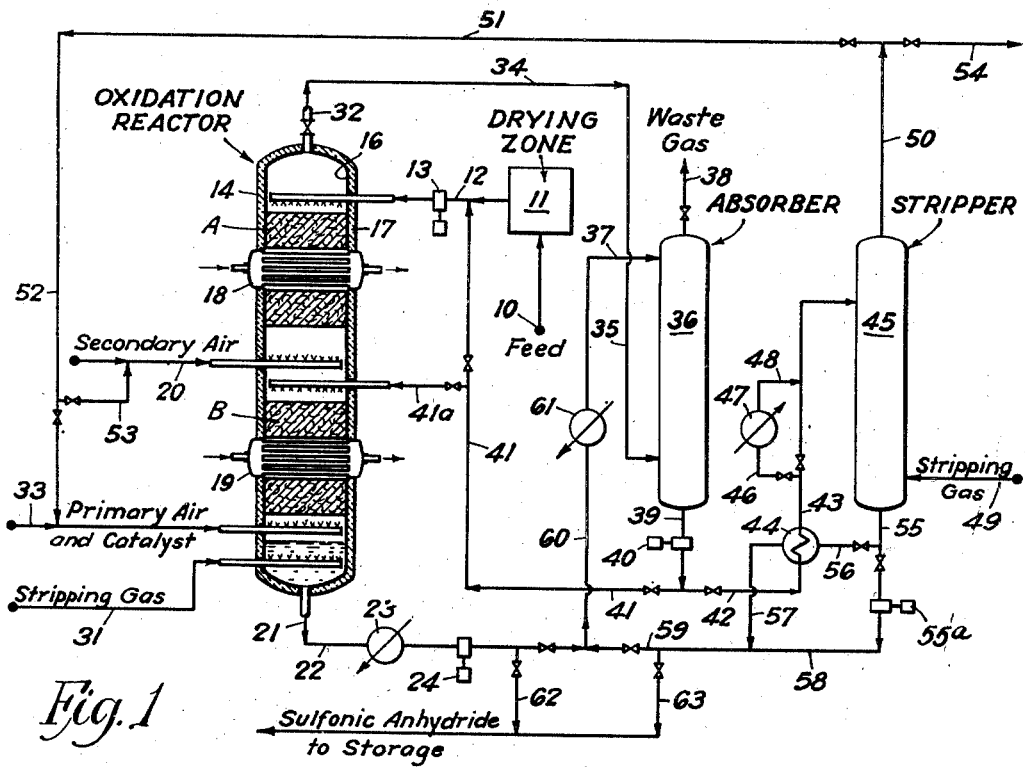

Nov. 29, 1949     W. A. PROELL     2,489,316

MANUFACTURE OF SULFONIC ANHYDRIDES

Filed Oct. 12, 1946

Inventor:—
Wayne A. Proell
By [signature]
           Attorney

Patented Nov. 29, 1949

2,489,316

UNITED STATES PATENT OFFICE 2,489,316

MANUFACTURE OF SULFONIC ANHYDRIDES

Wayne A. Proell, Chicago, Ill., assignor to Standard Oil Company, Chicago, Ill., a corporation of Indiana Application October 12, 1946, Serial No. 702,989

20 Claims. (Cl. 260—545)

This invention relates to the production of sulfonic anhydrides. More particularly, it relates to a catalytic process for the oxidation of substantially anhydrous organic sulfur compounds at a lower state of oxidation than sulfonic anhydrides to sulfonic anhydrides in an oxidation zone under substantially anhydrous conditions of operation. The term "sulfonic anhydrides" as employed in the specification and claims is intended to denote compounds having the formula $(RSO_2)_2O$ wherein R is an organic radical and S and O are sulfur and oxygen respectively.

Sulfonic anhydrides have been rare chemicals up to the present time, principally because no satisfactory or economical method of synthesis was available. In his comprehensive treatise, "The Organic Chemistry of Sulfur" (John Wiley & Sons, Inc., New York, 1944), C. M. Suter (page 104) points out that methanesulfonic anhydride, whose synthesis was described by Billeter in 1905 (Ber. 38, 2019), appears to be the only simple aliphatic sulfonic anhydride known. Very few aromatic sulfonic anhydrides have been synthesized; Suter (loc. cit., pages 555—556) mentions only benzenesulfonic, benzene-o-disulfonic and p-xylene-2,3-disulfonic anhydrides. Prior art methods for the synthesis of sulfonic anhydrides have involved costly reagents and were hopelessly uneconomical from the commercial standpoint. Thus, methanesulfonic anhydride has been prepared by reacting methanesulfonyl chloride with silver cyanate or silver methanesulfonate. Benzenesulfonic anhydride was prepared by analogous metathetical reactions.

The present invention offers a novel and generally applicable process for the production of sulfonic anhydrides from cheap starting materials in good yields. By the employment of the process of the present invention I have been able readily to secure alkanesulfonic anhydrides which have not, to my knowledge, been prepared heretofore.

It is an object of this invention to provide a novel process for the production of sulfonic anhydrides by the catalytic oxidation of organic sulfur compounds such as disulfides, disulfoxides and disulfones. Another object is to provide novel and efficient catalysts for the oxidation of organic sulfur compounds to sulfonic anhydrides. An additional object of my invention is to provide a process for the catalytic oxidation of organic sulfur compounds to sulfonic anhydrides wherein normally gaseous catalysts are employed, which catalysts can be recovered from reaction products and re-employed in the catalytic oxidation process.

Still another object of this invention is to provide an oxidation process for the production of alkanesulfonic anhydrides from alkyl disulfides, disulfoxides, disulfones or their mixtures. One more object of this invention is to provide mixtures of sulfonic acids and the corresponding sulfonic anhydrides which have not heretofore been available to the art. These and other objects will become apparent from the ensuing description of my invention, taken with the accompanying figures.

The process of the present invention comprises contacting a substantially anhydrous charging stock comprising an organic sulfur compound selected from the group consisting of disulfides, disulfoxides and disulfones with oxygen and a small, catalytic proportion of a nitrogen oxide in the absence, substantially, of water, under controlled temperature conditions for a period of time sufficient to produce a sulfonic anhydride.

Desirable charging stocks for the present process are compounds containing, in addition to sulfur, one or more unsubstituted hydrocarbon radicals, particularly alkyl or cycloalkyl radicals. Examples of suitable alkyl disulfides include dimethyl, dipropyl, methyl butyl, ethyl propyl, dicyclohexyl, dicetyl, dilauryl and benzyl methyl disulfides. I may also employ aromatic disulfides such as diphenyl, phenyl tolyl, phenyl xylyl, and phenyl naphthyl disulfides.

Di-tert-alkyl disulfides such as di-tert-octyl disulfide and di-tert-hexadecyl disulfide decompose under the conditions of the process of this invention to yield nondescript products. I may employ charging stocks comprising disulfoxides and disulfones.

When trisulfides or higher polysulfides, e. g., dialkyl trisulfides, are employed in the process of this invention, part of the sulfur is oxidized to sulfuric acid. Since the presence of sulfuric acid in the product is ordinarily not desired, it is desirable to remove polysulfides from the charging stocks. A method which I have found to be very suitable comprises extracting the charging stock with a polyamine, e. g. ethylenediamine, diethylenetriamine, triethylenetetramine or the like, which selectively dissolves sulfur and organic polysulfides and extracts practically no disulfides.

The feed stock may be a pure compound or a mixture of compounds, optionally in admixture with substances, such as paraffinic hydrocarbons which are not normally oxidized to an appreciable extent under the conditions employed in my process. A preferred feed stock is a mixture consisting essentially of dialkyl disulfides, of the type obtained as a by-product in the extraction of mercaptans from petroleum distillates with a caustic-solutizer solution followed by regeneration of the solution in the presence of an oxidation catalyst to produce a mixture of dialkyl disulfides which are separated from the caustic solution by settling or by extraction with a solvent, such as petroleum hexane, naphtha, or the like. Either the crude disulfides or a fraction thereof can be oxidized by my technique.

The extraction of petroleum distillates with caustic-solutizer solutions has been described by D. L. Yabroff and E. R. White (Ind. Eng. Chem. 32, 950–935 (1940) and has been reviewed by V. A. Kalichevsky and B. A. Stagner ("Chemical Refining of Petroleum," Revised edition, 1942, pp. 218–220). The production of disulfides by catalytic oxidation of mercaptans (present as mercaptides) in caustic-solutizer solutions has been described by J. O. O'Donnell (The Oil and Gas Journal, pp. 45–47 (July 1, 1944)). However, a brief description of caustic-solutizer extraction of mercaptan-containing petroleum fractions and conversion of the extracted mercaptans to hydrocarbon disulfides may not be amiss.

A petroleum distillate e. g., gasoline, is intimately mixed or countercurrently extracted with a solution of caustic alkali having a concentration of the order of 5–50%, preferably about 10–25% (equivalent to 2–7 N alkali). Sodium hydroxide and potassium hydroxide are commercially convenient. In order to increase the solubility of mercaptans, especially higher alkyl mercaptans such as butyl, amyl, and hexyl mercaptans, in the caustic solution one or more solubility promoters or "solutizers" is added to the caustic. Suitable solubility promoters are the simple phenols, particularly cresols and xylenols, the organic acids, particularly those having 3–7 carbon atoms such as isobutyric acid, aromatic acids such as cumic acid, alkali metal salts of alkanesulfonic or alkoxyalkanesulfonic acids having between 1 and 8 carbon atoms in the alkyl group, the alcohols, glycols, amines, and hydroxyamines. The preferred amount of solubility promoter is about 5 to about 25 weight percent of the caustic solution which is employed. The mercaptans dissolve in the caustic solution and react therewith to form mercaptides. The mercaptide-containing caustic solution is separated from the petroleum distillate and regenerated by blowing with air or oxygen, usually at a temperature between 50 and 200° F., which operation oxidizes the mercaptides to disulfides and liberates the bound caustic. In order to increase the rate of oxidation of the mercaptides, a catalyst is added to the caustic solution. Suitable catalysts are phenolic compounds, e. g., naturally occurring phenolic compounds such as the tannins. The resulting disulfides can be separated from the caustic solution by settling or extraction with naphthas or the like.

A representative dialkyl disulfide mixture produced from a light naphtha by the operation of a caustic-solutizer and catalytic caustic regeneration process of the type described above boils in the range of about 115 to about 400° F., with very little material distilling below about 250° F. Fractionation analysis indicates that the predominant components are dimethyl, methyl ethyl, diethyl, methyl isopropyl, methyl n-propyl, and dipropyl disulfides. From higher boiling naphthas it is possible to recover higher boiling disulfides which can be oxidized by the process of the present invention.

In accordance with my invention the organic sulfur compounds to be converted to sulfonic anhydrides are oxidized under substantially anhydrous conditions by means of a gas stream containing free oxygen, as in air, in the presence of a small, catalytic quantity of one or more nitrogen oxides selected from the group consisting of $NO$, $NO_2$, $N_2O_3$, $N_2O_4$ and $N_2O_5$. Although all members of this group are useful, it is not intended to imply that they are equally efficacious in all respects. The organic sulfur compound is oxidized by free oxygen charged to the oxidation reactor and not by the nitrogen oxide or nitrogen oxides, which can be recovered unchanged upon completion of the oxidation reaction and can be reused to catalyze the oxidation of further quantities of charging stock.

The quantity of nitrogen oxide used as the catalyst, will, naturally, vary with the particular nitrogen oxide selected for use, the particular feed stock and the reaction rate desired. In general, it may be said that between about 1 and about 10 percent by volume of nitrogen oxides based on the total oxygen absorption is necessary, the amount varying with the pressure of the gas; i. e., high pressures permit lower $NO_2$ contents; usually the use of about 3 to about 5 percent by volume based on the total volume of oxygen consumed is preferable. The nitrogen oxide catalyst can be introduced into the oxidation zone with the stream of oxidizing gas, with the organic sulfur compound feed stock, or separately. The nitrogen oxide catalyst can be recovered from effluents passing from the oxidation zone and recycled to the same or a different oxidation zone.

Although water is a necessary reactant for the production of sulfonic acids, except where mercaptans are being oxidized, it is necessary rigorously to exclude water from the oxidation reaction zone in order to obtain good yields of sulfonic anhydrides. The materials charged to the oxidation zone can be suitably dried to the desired degree by conventional methods which need not be detailed here.

The oxidation temperature and reaction period will be selected with reference to the particular charging stock being oxidized, the reaction rate which it is desired to maintain and with regard to the other reaction variables. As a rule, temperatures between 0° C. and about 150° C. may be employed in the present oxidation process. I have observed that, initially, the oxidation proceeds at a satisfactory rate at relatively low temperatures in the range of about 0 to about 50° C. but, as the concentration of sulfonic anhydride in the reaction mixture increases, the rate of oxygen absorption in the reaction mixture decreases gradually. The particular sulfonic anhydride concentration in the reaction mixture which is coincident with sufficiently reduced rates of oxygen absorption to make the process unattractive will depend to a large extent on the particular anhydride in question. Ordinarily, the oxygen absorption rate of the reaction mixture drops undesirably when between about 50 percent and about 70 percent of the oxygen theoretically required has been absorbed in the reaction mixture. At this stage I have found it expedient to raise the temperature of the reaction mixture to a value between about 40° C. and about 150° C. in order to finish the production of sulfonic anhydride at a desirable rate.

The reaction may be started at room temperature and, since the reaction is exothermic, the temperature of the reaction mixture increases; the rate of oxidation may thereafter be controlled by abstracting heat from the reaction zone at a rate sufficient to maintain the desired reaction temperature. Where the organic sulfur compound feed stock is maintained in the liquid phase during oxidation, the reaction temperature may be controlled by introducing a vaporizable inert liquid, e. g., petroleum hexane, into the oxidation zone and allowing it to vaporize from the oxidation mixture under controlled pressure, thus cooling the oxidation mixture by abstracting heat to arrive at the vaporization temperature and also by abstracting its latent heat of vaporization. Indirect heat exchange apparatus may also be used to control the temperature in the oxidation zone.

It is convenient and preferable to maintain the sulfur compound feed stock in the liquid phase during the oxidation reactions. This result can be readily attained by proper control of the pressure on the oxidation zones. Pressures in the range of about 5 to about 100 p. s. i. g. are convenient and generally sufficient. Other reaction conditions being constant, the rate of oxidation will increase with increasing partial pressures of oxygen in the oxidation zone. When using air or other gases containing relatively small proportions of oxygen, e. g., flue gases containing free oxygen, it is desirable to operate the oxidation zone under pressure to increase the oxygen concentration therein. The oxidation reactions may, however, be effected in the vapor phase, especially when relatively low-boiling sulfur compound feed stocks, e. g., feed stocks boiling below about 245° F., are employed.

The reaction period depends on the particular feed stock and other reaction variables. It can, in each case, be determined by simple experiment.

My novel oxidation process may be carried out batchwise, continuously, or semi-continuously. The oxidation process may also be effected in a number of stages with or without product separation between stages. The oxidation reactions may be effected in conventional reaction kettles or autoclaves, or in tubular convertors or contacting towers. A suitable form of reactor is a vertical tower provided with contacting means, such as bubble cap trays, or with packing, such as ceramic bodies or fiber glass mats. Countercurrent contacting of liquid sulfur compound feed stock and the oxidizing gas stream proceeds efficiently in the types of reaction tower just described; the liquid feed is passed downwardly through the tower against a rising stream of oxidizing gas, all of which may be admitted at a point near the bottom of the tower or, preferably, aliquot portions of which are introduced at vertically spaced points along the tower. A tubular reactor equipped for spaced injection of oxidizing gas and catalyst into a flowing stream of liquid or vaporized feed stock and oxidation products may also be employed; a reactor of this type permits fine control of the extent of oxidation.

One embodiment of the process of my invention wherein two-stage countercurrent oxidation is effected is illustrated in Figure 1. Referring to this figure, the feed stock, for example a charging stock containing a dialkyl disulfide, is pumped from source 10 into a drying zone indicated schematically by 11. In this drying zone the water content of the charging stock is substantially completely removed. Any suitable drying system may be employed. For example the charging stock may be dried by refrigeration methods, by passage through an organic drying medium such as ethylene glycol or through inorganic dehydrating solutions such as lithium chloride, by passage over magnesium perchlorate or $P_2O_5$ coated on glass beads, or drying may be effected by the selective adsorption of water from the charging stock, for example upon charcoal or other suitable adsorptive material which is preferably maintained at a low temperature by solid carbon dioxide or other refrigerant medium. Drying of the charging stock may be effected by a combination of two or more of the above methods.

The charging stock comprising the sulfur compound to be oxidized passes from drying zone 11 into line 12 and then is forced by pump 13 into oxidation reactor 14. As shown, reactor 14 comprises a shell 16 provided with insulation or lagging 17 and internal heat exchangers 18 and 19 provided with headers and tubes. In order to secure intimate contacting of the charging stock and oxidizing gas streams in the reactor, packed contacting zones A and B are provided. Any suitable packing materials may be used in these zones, e. g. ceramic bodies, glass beads, glass mats, glass wool, Raschig rings or Berl saddles of suitable materials, and the like. Zone A is maintained at a temperature between about 0° C. and about 50° C. In zone A the feed stock flows downwardly through the packing material and heat exchange surfaces against a counterflow of oxidizing gases and catalysts, derived from zone B and from line 20. Substantial oxidation is effected in zone A so that from about 50 to about 70 percent of the theoretically required oxygen absorption in the charging stock is effected in this zone.

The partially oxidized charging stock passes from the bottom of zone A downwardly through zone B against a counterflow of an oxidizing gas stream, for example primary air, and a catalyst such as $N_2O_4$ introduced into reactor 14 through line 33. In order to oxidize the charging stock further in zone B, a temperature between about 50° C. and about 150° C. is maintained therein. In zone B, the sulfonic anhydride content of the charging stock may be raised to a value between about 80 and 95 weight percent or even more, the remainder comprising sulfonic acids, small amounts of sulfuric acid and unconverted or partially converted charging stock.

In order to avoid loss of nitrogen oxide catalyst with the oxidation products leaving reactor 14 by line 21, a stripping gas is introduced into the reactor through line 31. A suitable stripping gas is air or oxygen, which simultaneously strips and, to some extent, reoxidizes the nitrogen oxide catalyst which is then further utilized in zones B and A. However, inert, dry stripping gases such as nitrogen, substantially deoxygenated flue gases, or carbon dioxide may also be used. When the charging stock has been oxidized to the desired extent, stripped products are passed from the bottom of reactor 14 through lines 21, 22, cooler 23, pump 24 and valved line 62 to storage or a desired aftertreatment. Care must be exercised to maintain the gas streams passing into reactor 14 through lines 20, 31 and 33 in substantially anhydrous condition.

A gas stream passes overhead from reactor 14 through valved line 32 and lines 34 and 35 into the lower portion of nitrogen oxide absorber 36. In the absorber, the gas stream containing nitrogen or other inert diluents and a nitrogen oxide is washed with a counterflow of cold oxidation products introduced through line 37. The absorber is operated at a temperature not in excess of about 45° C. and preferably at temperatures in the range of about 0° C. to about 30° C. Waste gases are removed from the absorber through valved line 38. The enriched absorbent is removed from the absorber through line 39 and pump 40 and may be cycled through valved line 41 directly to line 12 to intermingle with charging stock passing into zone A of reactor 14. Alternatively, a portion of the material passing through line 41 may be diverted through valved line 41a for recycle through zone B only of reactor 14. If desired the enriched absorbent medium passing from absorber 36 through line 39 may be pumped through valved line 42 and heat exchanger 44 in valved line 43 to a stripper 45. Further heat may be imparted to the enriched absorption medium by by-passing it from line 43 into valved line 46 to heater 47 and thence back to line 43 through line 48.

In stripper 45, the enriched absorption medium is subjected to a temperature sufficiently elevated to volatilize a substantial portion or all of the absorbed nitrogen oxides. Suitable stripping temperatures fall within the range of about 70° C. to about 110° C. In order to facilitate stripping it is desirable to introduce a stripping gas, for example, air, oxygen, nitrogen, carbon dioxide or the like through line 49. The stripping gas is preferably quite dry. A gas stream containing the desorbed nitrogen oxides passes overhead from stripper 45 through valved lines 50 and 51 to valved line 52 whence all or a portion may be passed through valved line 53 into the secondary air line 20 or into line 33 to join the stream of primary air and catalyst. If desired, part of the stripped gases may be removed from the system by valved line 54. The lean absorbent medium is passed from the bottom of stripper 45 by means of valved lines 55 and 56 through heat exchanger 44 and thence through lines 57, 58, 59, 60, and cooler 61 and line 37, for recycle to absorber 36. Alternatively all or a portion of the lean absorbent may be passed through lines 55 and pump 55A into line 58 for recycle to the absorber 36 via lines 59, 60, and cooler 61, and line 37.

Concentrated sulfonic anhydride may be withdrawn from the absorption system through valved line 63. Concentrated sulfonic anhydride solutions for use as an absorption medium may be withdrawn from reactor 14 through lines 21 and 22, cooler 23, pump 24, line 60, cooler 61 and line 37 into absorber 36.

It will be understood that, although reactor 14 is shown as containing zones A and B, these zones can be situated in different towers. In addition, although a fixed bed of contacting or packing material is shown in Figure 1, it should be understood that I may use moving beds of contacting material or fluidized solid contacting material as is well known in the art of catalysis, especially in the art of hydrocarbon conversions.

Figure 2:
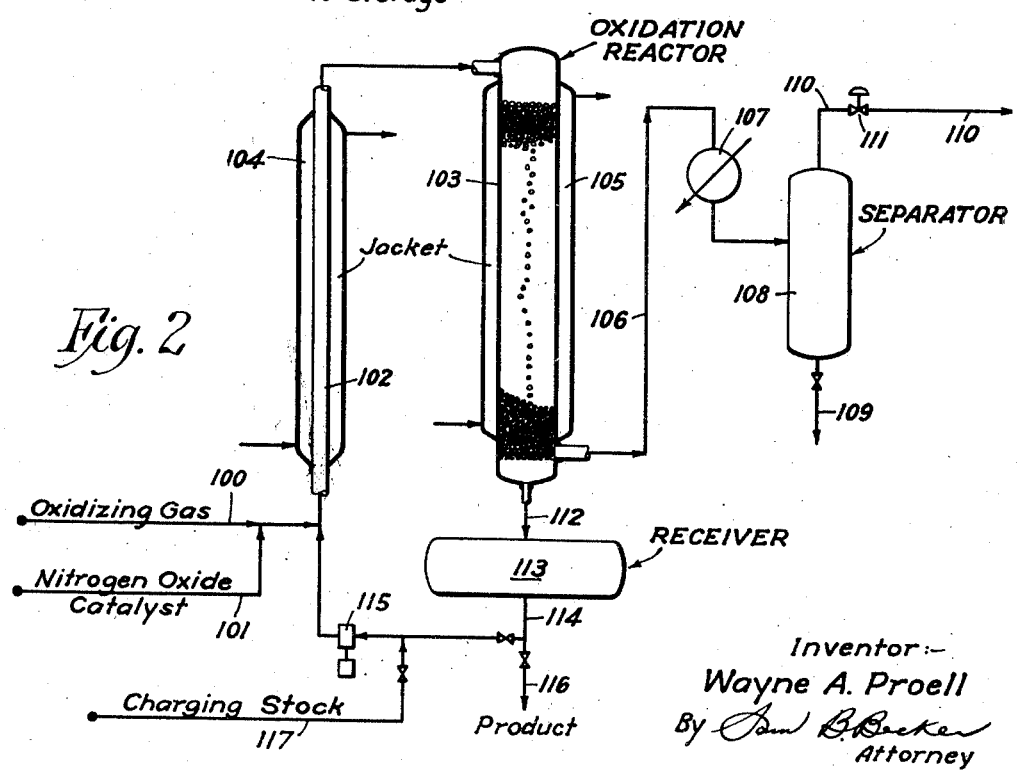

Figure 2 illustrates a specific form of oxidation reactor and process flow which is adapted to the production of sulfonic anhydrides from organic sulfur compounds such as disulfides, disulfoxides or disulfones. As shown, an oxidizing gas containing free oxygen, for example, air, passes through line 100 and is joined by a nitrogen oxide catalyst, e. g., $N_2O_4$, entering the system through line 101. The mixed gas stream is forced into line 102 wherein it impinges upon a liquid stream of charging stock or a mixture of charging stock and recycle stock containing one or more sulfur compounds, for example one or a mixture of dialkyl disulfides. The gas stream exerts a gas lift effect on the liquid stream and raises the liquid through line 102, which thus serves as a gas lift tube, into the upper portion of oxidation reactor 103. Partial oxidation of the liquid stream is effected in line 102, e. g. up to about 25 percent of the theoretical oxygen absorption, and the remainder is effected in reactor 103. In order to facilitate control of the temperature of the reaction system, a cooling jacket or equivalent cooling means 104 may be placed in contact with line 102. Reactor 103 is likewise provided with a temperature control jacket 105 through which a heating or cooling medium may be circulated as required by the course of the reaction proceeding within the reaction zone. In reactor 103 the oxidizing gas, catalyst and charging stock are passed concurrently down through the reaction space which may, if desired, be provided with a packing material to increase the intimacy and uniformity of contacting therein. Suitable packing materials include glass or other ceramic materials presenting an extensive surface, for example in the form of glass wool, felt, mat, beads, Raschig rings, thimbles or the like. All or part of the space in the oxidation reactor may be packed. Preferably a packing, e. g. Berl saddles, of ceramic material, is used.

Spent gases leave the reactor through line 106 and pass through condenser 107 into a separator 108. Separator 108 may be maintained at a sufficiently low temperature to trap as a liquid a substantial proportion of the nitrogen oxides in the spent gases from the reactor, which liquid may be withdrawn through line 109. Spent gases leave the separator by line 110 and pass through pressure control valve 111; they can pass (by lines not shown) to line 100 or to a nitrogen oxide absorber. Liquid products pass from the lower portion of oxidation reactor 103 through line 112 into separator 113, whence they are withdrawn through valved line 114 and pump 115 for recirculation through line 102 or withdrawn from the specific oxidation cycle through valved line 116. Charging stock may be introduced into the oxidation system through valved line 117 and passes into line 114 and thence into pump 115.

It will be understood that I can use oxidation reaction systems as shown in Figure 2 in series or in parallel. An advantage of series operation with reactors of the type shown in Figure 2 is that two-stage oxidation can readily be effected, the first stage reactor operating at a temperature between about 0° C. and about 50° C. and the second stage reactor operating at a temperature maintained between about 50° C. and about 150° C.; the nitrogen oxide catalyst may be passed through the high temperature reactor and the low temperature reactor in series. Also, when the reactors are employed in series, the charging rates of oxidizing gas, catalyst and charging stock can be correlated in each reactor so that optimum operating conditions are achieved.

The following examples are illustrative of my invention but are not intended to limit the same.

Example 1

Diethyl disulfide was oxidized in a concurrent-flow, gas lift apparatus of the type shown in Figure 2 with dry air-$NO_2$ mixed gas containing about 2 percent of $NO_2$. The oxidation was initiated at 80° F. and the temperature was allowed to rise due to the exothermic character of the reaction. When about 70 percent of the theoretically required oxygen for the production of ethanesulfonic anhydride had been absorbed by the reaction mixture, the rate of oxidation, as evidenced by the rate of oxygen absorption in the reaction mixture, decreased markedly. The temperature of the reaction mixture was then increased to 140° F. and the remaining required oxygen was added. The product was a clear yellow oil. On shaking the oil with cold water about 20 percent thereof dissolved. Although many sulfonic acids dissolve readily in cold water, alkanesulfonic anhydrides do not dissolve appreciably. The residual oil was clear yellow in color and dissolved irreversibly upon prolonged shaking with warm water or dilute alkali. The residual oil did not react with appreciable amounts of either potassium permanganate solution or bromine. Titration of the crude reaction product with alkali showed that 23 percent reacted instantly with dilute cold alkali, while the residue reacted slowly but completely. Therefore, the crude reaction product assays 106.7 percent anhydrous sulfonic acid, viz. 23 percent ethanesulfonic acid and 75 percent ethanesulfonic anhydride.

In a similar oxidation, an abundant crop of white crystals formed in the low temperature condenser of the oxidation reactor. These crystals appeared to melt at about 95 to 113° F., evolved $NO_2$ in contact with water or moist air and released ethanesulfonic anhydride. These crystals and the like may find application as a bleaching agent for flour or in other applications necessitating the slow or controlled release of an oxidizing agent.

Example 2

Pure dimethyl disulfide (350 cc.) was placed in a reactor of the type illustrated in Figure 2, in which the gas lift leg was immersed in a water bath. Air containing about 2 percent of $NO_2$ was passed into the reactor at the rate of about 4 cubic feet per hour. Oxidation was initiated at the ambient temperature (about 75° F.) and the reaction mixture was allowed to warm up as the reaction proceeded. The efficiency of oxygen absorption in the charging stock increased rapidly from 0 to 100 percent. The air rate was then increased to 6 cubic feet per hour, whereupon about 60 percent of the oxygen which was passed into the reactor was absorbed. Oxidation was continued for 8 hours, at which time about 50 percent of the oxygen charged to the reactor was being absorbed. The reactor was then shut down overnight and oxidation was continued the next morning as before. The water bath surrounding the gas lift leg was heated. The air rate was slowly reduced as the reaction was abating. After a total reaction time of 14 hours, the rate of oxygen absorption in the reaction mixture had dropped almost to zero, even with the reactor at 176° F. The reactor was emptied into storage bottles. The products solidified rapidly to a solid white mass of crystals which were fused at about 160° F. and blown with air to remove dissolved $NO_2$. Titration analysis of a sample of these crystals yielded the following information:

Sulfuric acid, 0.17 percent by weight
Methanesulfonic acid, 22 percent of weight
Methanesulfonic anhydride, ca. 78 percent by weight

Example 3

Pure n-butyl disulfide (300 cc.) was oxidized in the same reactor used in the previous examples. As before, reaction was inaugurated at room temperature. Air containing about 2 percent $NO_2$ was passed into the charging stock at the rate of 3.5 cubic feet per hour, resulting in about 80 percent oxygen absorption. The reaction mixture was allowed to stand overnight at 80° F. and then the temperature was raised to 120° F., at which temperature the oxidation was completed. Upon stripping $NO_2$ from the liquid product with air, the anhydride turned black. A sample of the black anhydride was dissolved in benzene and added to a benzene solution of p-toluidine. Butanesulfon-p-toluidide was recovered by alkali extraction of the reaction solution, precipitation by neutralization of the alkali extract, and ether extraction of the precipitate. The yield of toluidide indicated that the reaction product contained 62 percent by weight of n-butanesulfonic anhydride.

Example 4

The charging stock was 500 cc. of a mixture of distilled disulfides obtained as a by-product in the extraction of mercaptans from a petroleum naphtha with a caustic-solutizer solution. The mixed disulfides comprised chiefly methyl, ethyl and isopropyl disulfides. Charging stock was oxidized in a large air lift reactor employing air containing about 2 percent $NO_2$ at the rate of 6 cubic feet per hour. Oxidation was inaugurated at 80° F. and the temperature was raised slowly throughout the operation to a final temperature of 132° F. The efficiency of oxygen absorption began at 0, rose after 2 hours to 83 percent and slowly declined to 0. Upon completion of the oxidation the reaction product was stripped of nitrogen oxides by a stream of air at room temperature. A 200 cc. sample of the crude reaction product was reacted in ether with 200 cc. of aniline. A mixture of sulfonanilides which was insoluble in hexane was obtained, the quantity thereof corresponding to a content of 35 percent by weight of anhydride in the crude oxidation product. The mixture of anilides was a very viscous oil having a golden yellow color showing ore-collecting properties and a strong solutizer action.

As the above examples indicate, the oxidation process of this invention produces a reaction mixture containing a variable proportion of sulfonic anhydrides, the remainder usually comprising sulfonic acid and small amounts of unconverted charging stock. The reaction mixtures may be used as such to fortify aqueous sulfonic acids. For example, a reaction product of my process comprising principally ethanesulfonic anhydride and ethanesulfonic acid may be used to increase the acid strength of aqueous ethanesulfonic acid, since the anhydride reacts with warm water to produce ethanesulfonic acid. It is advantageous to prepare sulfonic acids by dry oxidation of disulfides to sulfonic anhydrides, followed by hydration of the anhydrides, rather than by direct oxidation of disulfides to sulfonic acids by oxidation in the presence of water, since in the former process oxidation proceeds more smoothly and with less release of heat than in the latter process.

Sulfonic anhydrides, for example alkanesulfonic anhydrides, are extremely reactive chemical reagents and are capable of supplementing or supplanting the corresponding sulfonyl halides in various chemical reactions.

The reactivity of sulfonic anhydrides with water has been mentioned and points to their utility as drying agents for neutral gases, particularly air, nitrogen, oxygen, carbon monoxide, carbon dioxide, the rare gases, methane, ethane, propane, etc. The alkanesulfonic anhydrides, particularly, constitute novel drying agents. Ethanesulfonic anhydride and the higher homologs are liquids at room temperature.

The absorption of water vapor in sulfonic anhydrides is desirably effected at room temperature or somewhat higher temperatures ranging up to about 280° F. The sulfonic anhydrides exhibit, in general, very low vapor pressures and absorb rather large amounts of water before exhaustion. In comparison with other drying agents such as magnesium perchlorate and phosphoric anhydride, sulfonic anhydrides are nonhazardous in that they are not explosive, do not form explosive compounds and do not attack human skin nearly as readily as strong inorganic acids such as sulfuric acid. The sulfonic anhydrides can be employed in place of or in conjunction with conventional drying agents.

In the operation of the present oxidation process, a portion of the sulfonic anhydride product or a mixture of sulfonic acid and sulfonic anhydride may be employed to finish the drying of the oxygen-containing gas and catalyst streams passing to the oxidation unit.

Sulfonic anhydrides react not only with water but with numerous other compounds, both organic and inorganic, containing reactive hydrogen atoms.

Sulfonic anhydrides may be treated with inorganic alkaline materials in aqueous or non-aqueous solution to produce salts of the corresponding sulfonic acids. For example, alkanesulfonic anhydrides may be treated with sodium hydroxide in either aqueous or alcoholic solution to produce sodium alkanesulfonates. The sulfonic anhydrides may also be treated with alkaline reagents such as sodium methylate, sodium ethylate, sodamide, sodium alkylamides, sodium arylamides, and the like.

Sulfonic anhydrides react with alcohols and substituted alcohols to produce sulfonic esters and sulfonic acids. Sulfonic anhydrides produced by the process of this invention, particularly the alkanesulfonic anhydrides may be reacted with alcohols such as ethanol, normal-propanol, isopropanol, butanols, etc.; substituted alcohols such as ethylene chlorohydrin, ethylene cyanohydrin, beta-nitroethanol, their homologs and analogs, and the like.

Sulfonic anhydrides react readily with ammonia and amines to produce amides or ammonium salts (note Examples 3 and 4). The ammonia or amine may be employed as such or in solution in a solvent such as water, alcohol, benzene, etc. Thus p-toluidine, in solution in benzene, reacts at room temperature with alkanesulfonic anhydrides to produce the corresponding p-toluidides. In the presence of alkanesulfonic acids, the last-named reaction is selective for the sulfonic anhydrides and yields reproducible results. The alkanesulfon-p-toluidides are separated from the reaction mixture as solids of rather high melting point and are purified by recrystallization, dried and weighed.

The alkanesulfonamides are useful additives to ore flotation reagents. Suitable additives have the general formula $$R_1SO_2N\overset{H}{\underset{|}{\phantom{N}}}R_2$$

wherein $R_1$ is an alkyl group having between 1 and 12 carbon atoms and $R_2$ is a hydrocarbon group containing between 1 and 12 carbon atoms. It is preferred that either $R_1$ or $R_2$ contain 6 or more carbon atoms. It is preferred that the $R_2$ group be an aryl group such as a phenyl group, a chlorophenyl group or the like.

As an example of the basic effect of the sulfonanilides, one drop of $C_1$—$C_4$ alkanesulfonanilide was added to 5 cc. of naphtha and 45 cc. water. One-half gram of powdered galena was added. On shaking, practically all the galena went into the naphtha-water interface and floated. The control test lacking the sulfonanilide floated only about 50%—60% of the ore.

Inasmuch as conventional collectors also supply this action, the more interesting behavior of sulfonanilides is an "anti-silicate floating" action demonstrated by the following. Two stoppered graduated cylinders were secured and charged with 50 cc. of water, 0.2 cc. heavy turpentine, and two grams of a 1:3 galena:silica sand powder. To one graduate was added one drop of $C_1$—$C_4$ alkanesulfonanilide. Both graduates were then shaken vigorously for two minutes, and the contents were then allowed to settle.

The galena in both graduates went completely into the turpentine oil froth. In the control test, however, a substantial amount of galeniferous froth was entrapped in the silica residue. Further, an additional amount of froth stuck to the glass vessel as an oily, galeniferous smear. In the graduate containing alkanesulfonanilide, however, none of the froth stuck to the silica, and none of it adhered to the walls of the glass vessel. The froth had a pronounced anti-silicate wetting effect which usually was quite striking. Translated into terms of ore recovery, this anti-silicate effect would mean substantially improved recovery of total values and a cleaner concentrate. It is well known that these two properties usually are mutually exclusive; it appears, therefore, that the sulfonanilides exert a novel effect which should be useful in practical flotation.

Sulfonanilides which can readily be produced from the sulfonic anhydrides can be used as plasticizers for synthetic resins, rubber, etc. I have prepared n-butanesulfonanilide as a yellow oil boiling at about 275° F. at a pressure of 0.06—0.1 mm. of mercury and have found it to be compatible with cellulose acetate and vinyl chloride resins. The alkanesulfonanilides, particularly those containing between about 1 and 5 carbon atoms in the alkyl group, appear to have some utility as solutizers in the extraction of mercaptans from petroleum products such as gasoline with aqueous caustic.

Sulfonic anhydrides may be reacted with alkanolamines, e. g. ethanolamine, to produce amides or amide esters which are of value for the production of surface active agents, plasticizers or the like.

Alkanesulfonic anhydrides react readily with active inorganic halogen compounds such as thionyl chloride to produce substantially quantitative yields of pure sulfonyl halides. The reaction can be formulated as follows:

In place of thionyl chloride, I may employ other active halogen compounds such as $PCl_5$, $COCl_2$ and the like.

Alternatively sulfonic anhydrides, for example alkanesulfonic anhydrides, may be converted to sulfonyl halides and sulfonic acids or their salts by treatment with a halogen acid such as hydrogen chloride, hydrogen fluoride, hydrogen bromide, or by treatment with a salt of a halogen acid. Thus, a sulfonic anhydride may be treated with hydrogen chloride gas at a temperature between about 20° C. and about 130° C., passing hydrogen chloride through the liquid at a suitable rate and maintaining a suitable pressure, e. g., between about 10 and about 760 mm. of mercury, in order to distill the resultant sulfonyl halide from the reactant mixture as formed. The reaction in question may be formulated as follows:

When sodium chloride is used the reaction may be formulated as follows:

Interesting derivatives may be prepared by the treatment of sulfonic anhydrides with reactive organometallic compounds such as Grignard reagents, metal alkyls or aryls and compounds of the type of sodiomalonic ester and the like.

Sulfonic anhydrides, for example alkanesulfonic anhydrides containing between about 1 and about 5 carbon atoms in the alkyl group, appear to act as solvents for metal halides containing an electron-deficient metal atom by forming complex compounds therewith. Thus, the sulfonic anhydrides may be used as solvents or absorbents for metal halides such as aluminum chloride, $BF_3$ and the like.

Sulfonic anhydrides, as such or in admixture with the corresponding sulfonic acids, may be employed as selective solvents for aromatic hydrocarbons. Thus a petroleum naphtha containing aromatic and paraffinic hydrocarbons may be extracted with alkanesulfonic anhydrides in order, selectively, to remove aromatic hydrocarbons from said naphtha. Alkanesulfonic anhydrides may also be employed as solvents for the chlorination of various organic materials or for nitration.

This application is a continuation-in-part of application for Letters Patent Serial Number 571,023, which was filed by Wayne A. Proell and Bernard H. Shoemaker on January 1, 1945, now U. S. Patent 2,433,395, and is directed to the manufacture of sulfoxides, sulfones and sulfonic acids by the catalytic oxidation of organic sulfur compounds having the general formula $R_1S_nR_2$, where $R_1$ and $R_2$ are organic radicals and $n$ is an integer between 1 and 6, with a gas containing free oxygen and a catalytic quantity of a nitrogen oxide.

I claim:

1. A process for the production of an alkanesulfonic anhydride which comprises oxidizing a substantially anhydrous charging stock comprising a dialkyl disulfide containing at least one non-tertiary alkyl group in an oxidation zone at a temperature between about 0° C. and about 150° C. with a gas containing free oxygen in the presence of a catalytic quantity of a nitrogen oxide selected from the group consisting of $NO$, $NO_2$, $N_2O_3$, $N_2O_4$ and $N_2O_5$ while substantially excluding water from said oxidation zone, removing from said oxidation zone a reaction mixture comprising an alkanesulfonic anhydride and an alkanesulfonic acid, and separating an alkanesulfonic anhydride from said mixture.

2. A process for the production of an alkanesulfonic anhydride which comprises oxidizing a substantially anhydrous charging stock comprising a dialkyl disulfide containing at least one nontertiary alkyl group in an oxidation zone at a temperature between about 0° C. and about 150° C. with a gas containing free oxygen in the presence of a catalytic quantity of a nitrogen oxide selected from the group consisting of $NO$, $NO_2$, $N_2O_3$, $N_2O_4$ and $N_2O_5$, while substantially excluding water from said oxidation zone, thereby producing a reaction mixture comprising an alkanesulfonic anhydride, an alkanesulfonic acid and a nitrogen oxide, stripping said nitrogen oxide from said reaction mixture and thereafter separating said sulfonic anhydride from the resultant mixture.

3. A process for the continuous production of a sulfonic anhydride which comprises concurrently passing a substantially anhydrous charging stock comprising a hydrocarbon disulfide, a gas containing free oxygen, and a catalytic quantity of a nitrogen oxide selected from the group consisting of $NO$, $NO_2$, $N_2O_3$, $N_2O_4$ and $N_2O_5$, downwardly through a substantially vertical oxidation zone, substantially excluding water from said oxidation zone, abstracting heat from said oxidation zone, withdrawing gases from the lower end of said oxidation zone, withdrawing a partially oxidized charging stock from the lower end of said oxidation zone, introducing at least a portion of said partially oxidized charging stock into the lower end of a gas lift tube, continuously introducing charging stock, a gas containing free oxygen and a catalytic quantity of a nitrogen oxide selected from the group $NO$, $NO_2$, $N_2O_3$, $N_2O_4$ and $N_2O_5$ into a lower end of said gas lift tube, abstracting heat from said gas lift tube, and passing the gas-liquid mixture from the upper end of said gas lift tube into the upper end of said oxidation zone.

4. A process for the production of an alkanesulfonic anhydride which comprises oxidizing a substantially anhydrous charging stock containing a dialkyl disulfide containing at least one nontertiary alkyl group in an oxidation zone at a temperature between about 0° C. and about 150° C. with a gas containing free oxygen in the presence of a catalytic quantity of a nitrogen oxide selected from the group consisting of $NO$, $NO_2$, $N_2O_3$, $N_2O_4$ and $N_2O_5$, while substantially excluding water from said oxidation zone.

5. A process for the production of a sulfonic anhydride which comprises oxidizing a substantially anhydrous charging stock comprising a hydrocarbon disulfide with a gas containing free oxygen in the presence of a catalytic quantity of a nitrogen oxide selected from the group consisting of $NO$, $NO_2$, $N_2O_3$, $N_2O_4$, and $N_2O_5$, while substantially excluding water from said oxidation zone.

6. A process for the production of a sulfonic anhydride which comprises oxidizing a substantially anhydrous charging stock comprising a dialkyl disulfide containing at least one non-tertiary alkyl group with a gas containing free oxygen in the presence of a catalytic quantity of a nitrogen oxide selected from the group consisting of $NO$, $NO_2$, $N_2O_3$, $N_2O_4$, and $N_2O_5$, while substantially excluding water from said oxidation zone.

7. A process for the production of a sulfonic anhydride which comprises oxidizing a substantially anhydrous charging stock comprising a hydrocarbon disulfide with a gas containing free oxygen in the presence of a catalytic quantity of a nitrogen oxide selected grom the group consisting of NO, $NO_2$, $N_2O_3$, $N_2O_4$, and $N_2O_5$, while substantially excluding water from said oxidation zone, removing a mixture comprising a sulfonic anhydride and a nitrogen oxide from said oxidation zone, and separating said nitrogen oxide from said mixture.

8. A process for the production of a sulfonic anhydride which comprises oxidizing a substantially anhydrous charging stock comprising a dialkyl disulfide containing at least one non-tertiary alkyl group with a gas containing free oxygen in the presence of a catalytic quantity of a nitrogen oxide selected from the group consisting of NO, $NO_2$, $N_2O_3$, $N_2O_4$, and $N_2O_5$, while substantially excluding water from said oxidation zone, removing a mixture comprising a sulfonic anhydride and a nitrogen oxide from said oxidation zone, and separating said nitrogen oxide from said mixture.

9. A process for the production of a sulfonic anhydride which comprises initially oxidizing a substantially anhydrous charging stock comprising a hydrocarbon disulfide with a gas containing free oxygen in the presence of a catalytic quantity of a nitrogen oxide selected from the group consisting of NO, $NO_2$, $N_2O_3$, $N_2O_4$, and $N_2O_5$, at a temperature between 0° C. and about 50° C., while substantially excluding water from said oxidation zone, until between about 50 percent and about 70 percent of the oxygen theoretically required for the production of a sulfonic anhydride from said sulfur compound has been absorbed by said charging stock, increasing the temperature of the resultant initial oxidation products above the temperature employed in the initial oxidation step, and oxidizing said initial oxidation products in an oxidation zone at a temperature between about 50° C. and about 150° C., while substantially excluding water from the last named oxidation zone, with a gas containing free oxygen in the presence of a catalytic quantity of a nitrogen oxide selected from the group consisting of NO, $NO_2$, $N_2O_3$, $N_2O_4$, and $N_2O_5$.

10. A process for the production of a sulfonic anhydride which comprises initially oxidizing a substantially anhydrous charging stock comprising a dialkyl disulfide containing at least one non-tertiary alkyl group in an oxidation zone with a gas containing free oxygen in the presence of a catalytic quantity of a nitrogen oxide selected from the group consisting of NO, $NO_2$, $N_2O_3$, $N_2O_4$, and $N_2O_5$, at a temperature between 0° C. and about 50° C., while substantially excluding water from said oxidation zone, until between about 50 percent and about 70 percent of the oxygen theoretically required for the production of a sulfonic anhydride from said sulfur compound has been absorbed by said charging stock, increasing the temperature of the resultant initial oxidation products above the temperature employed in the initial oxidation step, and oxidizing said initial oxidation products in an oxidation zone at a temperature between about 50° C. and about 150° C., while substantially excluding water from the last named oxidation zone, with a gas containing free oxygen in the presence of a catalytic quantity of a nitrogen oxide selected from the group consisting of NO, $NO_2$, $N_2O_3$, $N_2O_4$, and $N_2O_5$.

11. A process for the production of a sulfonic anhydride which comprises oxidizing a substantially anhydrous charging stock comprising a hydrocarbon disulfide in an oxidation zone at a temperature between about 0° C. and about 150° C. with a gas containing free oxygen in the presence of a catalytic quantity of a nitrogen oxide selected from the group consisting of NO, $NO_2$, $N_2O_3$, $N_2O_4$, and $N_2O_5$, while substantially excluding water from said oxidation zone, removing from said oxidation zone a reaction mixture comprising a hydrocarbon sulfonic anhydride and a hydrocarbon sulfonic acid, and separating said hydrocarbon sulfonic anhydride from said reaction mixture.

12. A process for the production of a sulfonic anhydride which comprises oxidizing a substantially anhydrous charging stock comprising a hydrocarbon disulfide in an oxidation zone at a temperature between about 0° C. and about 150° C. with a gas containing free oxygen in the presence of a catalytic quantity of a nitrogen oxide selected from the group consisting of NO, $NO_2$, $N_2O_3$, $N_2O_4$ and $N_2O_5$, while substantially excluding water from said oxidation zone.

13. A process for the production of a sulfonic anhydride which comprises oxidizing a substantially anhydrous charging stock comprising a hydrocarbon disulfide with a gas containing free oxygen in the presence of a catalytic quantity of $NO_2$, while substantially excluding water from said oxidation zone.

14. A process for the production of a sulfonic anhydride which comprises oxidizing a substantially anhydrous charging stock comprising a dialkyl disulfide containing at least one non-tertiary alkyl group with a gas containing free oxygen in the presence of a catalytic quantity of $NO_2$, while substantially excluding water from said oxidation zone.

15. A process for the production of a sulfonic anhydride which comprises initially oxidizing a substantially anhydrous charging stock comprising a hydrocarbon disulfide with a gas containing free oxygen in the presence of a catalytic quantity of $NO_2$, at a temperature between 0° C. and about 50° C. while substantially excluding water from said oxidation zone, until between about 50 percent and about 70 percent of the oxygen theoretically required for the production of a sulfonic anhydride from said sulfur compound has been absorbed by said charging stock, increasing the temperature employed in the initial oxidation step, and oxidizing said initial oxidation products in an oxidation zone at a temperature between about 50° C. and about 150° C., while substantially excluding water from the last named oxidation zone, with a gas containing free oxygen in the presence of a catalytic quantity of $NO_2$.

16. A process for the production of an alkanesulfonic anhydride which comprises oxidizing a substantially anhydrous charging stock containing a dialkyl disulfide containing at least one non-tertiary alkyl group in an oxidation zone at a temperature between about 0° C. and about 150° C. with a gas containing free oxygen in the presence of a catalytic quantity of $NO_2$, while substantially excluding water from said oxidation zone.

17. A process for the production of a sulfonic anhydride which comprises oxidizing a substantially anhydrous charging stock comprising a hydrocarbon disulfide in an oxidation zone at a temperature between about 0° C. and about 150° C. with a gas containing free oxygen in the presence of a catalytic quantity of $NO_2$, while substantially excluding water from said oxidation zone.

18. A process for the production of a sulfonic anhydride which comprises oxidizing a substantially anhydrous charging stock comprising methyl disulfide with a gas containing free oxygen in the presence of a catalytic quantity of $NO_2$, while substantially excluding water from said oxidation zone.

19. A process for the production of a sulfonic anhydride which comprises oxidizing a substantially anhydrous charging stock comprising ethyl disulfide with a gas containing free oxygen in the presence of a catalytic quantity of $NO_2$, while substantially excluding water from said oxidation zone.

20. A process for the production of a sulfonic anhydride which comprises oxidizing a substantially anhydrous charging stock comprising butyl disulfide with a gas containing free oxygen in the presence of a catalytic quantity of $NO_2$, while substantially excluding water from said oxidation zone.

WAYNE A. PROELL.

REFERENCES CITED

The following references are of record in the file of this patent:

UNITED STATES PATENTS

| Number | Name | Date |
| --- | --- | --- |
| 1,589,632 | Downs | June 22, 1926 |
| 2,061,617 | Downing | Nov. 24, 1936 |
| 2,204,652 | Bludworth | June 18, 1940 |
| 2,433,395 | Proell et al. | Dec. 30, 1947 |

OTHER REFERENCES

Whitmore, Organic Chemistry, 1937, page 168, publishers, D. Van Nostrand Co., Inc., New York.